Aug. 18, 1959   D C. FERGUSON   2,900,094
RAMP DEVICE
Filed July 11, 1957   2 Sheets-Sheet 2
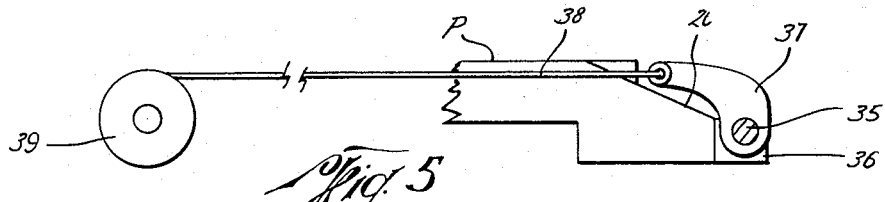
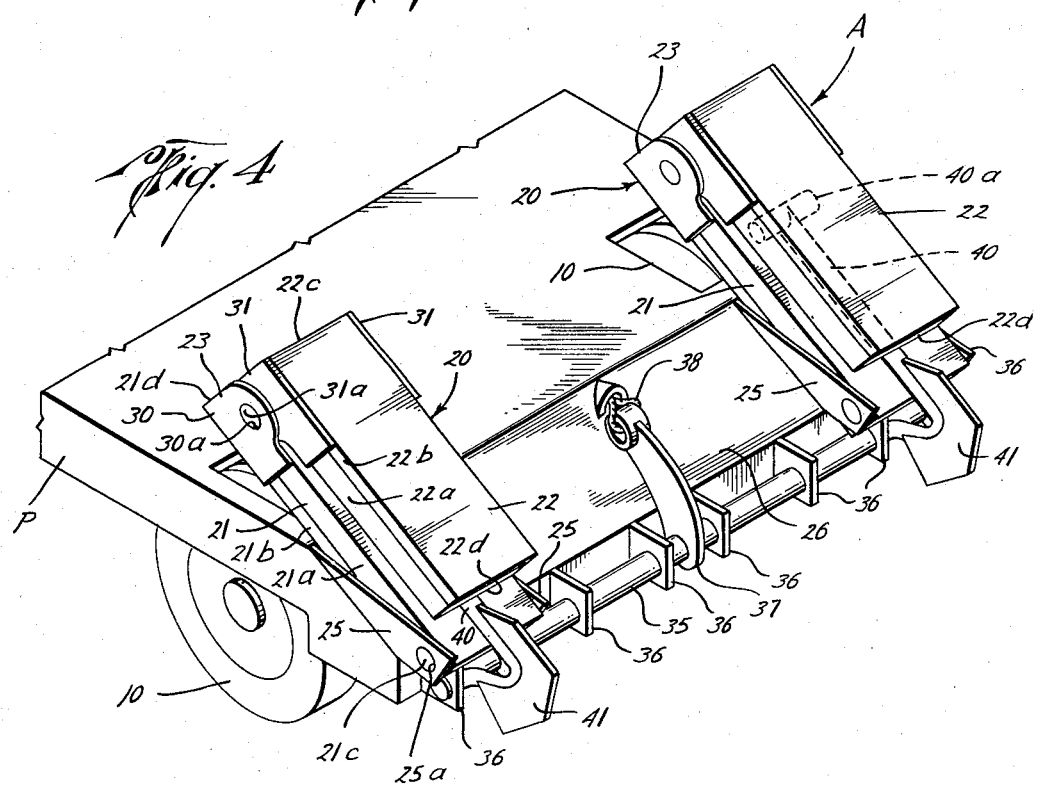
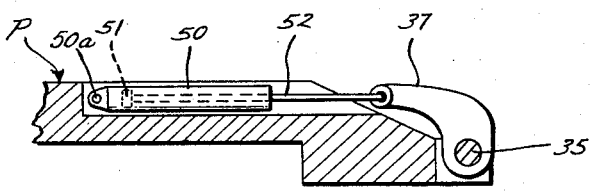
D. C. Ferguson
INVENTOR.
BY Hayden & Pravel
ATTORNEYS

United States Patent Office 2,900,094
Patented Aug. 18, 1959

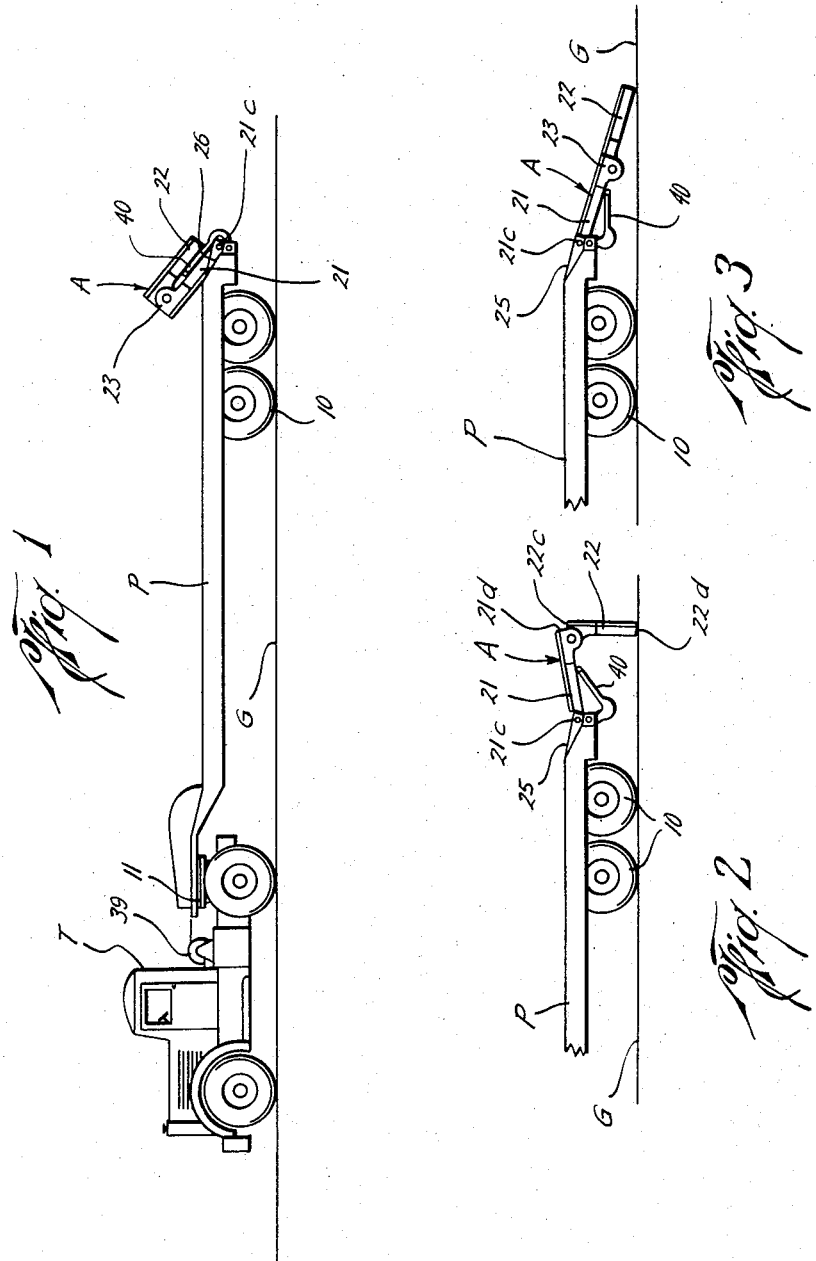

2,900,094

RAMP DEVICE

D C. Ferguson, Tomball, Tex., assignor of thirty-seven and one-half percent to R. Windham Rider and twenty-five percent to Robert L. Windham Application July 11, 1957, Serial No. 671,198

4 Claims. (Cl. 214—85)

This invention relates to ramp devices for loading and unloading vehicles or the like.

As is well known, heavy equipment such as tractors, dragline equipment, power shovel equipment and various other similar heavy equipment which are propelled by lug-type traction wheels are frequently carried or transported from one place to another on trailers or flat bed trucks. In other words, due to the fact that such heavy duty equipment has the lug-type traction wheels, and also due to the fact that it is relatively slow to move such equipment with its own power, it is desirable and often necessary to transport such equipment on trailers or trucks from one place of use to another. So far as is known, the loading and unloading of the heavy equipment from the trailers, trucks or other vehicles has heretofore been handled manually and has therefore been very cumbersome and slow so that a considerable amount of labor expense and service time has been required in such loading and unloading operations.

An object of this invention is to provide a new and improved ramp device or assembly which is preferably mounted on a trailer, truck or other vehicle for loading and unloading power-driven equipment or vehicles thereto and therefrom.

An important object of this invention is to provide a new and improved ramp device or assembly for the loading and unloading of equipment to and from a platform on a vehicle or the like, wherein such ramp is movable with power means from a retracted position to a position for receiving the equipment as it is moved to or from the platform.

Another object of this invention is to provide a new and improved ramp device which is power-actuated for positioning the ramp device for the loading and unloading of equipment therewith and for also positioning such ramp device in a retracted position off the ground for transportation purposes.

A particular object of this invention is to provide a new and improved trailer-bed assembly wherein a pair of ramp units are adapted to be mounted at the end of the trailer for movement to an inclined position extending from the ground level to the trailer-bed so that heavy power equipment or the like can be moved up or down such ramp units to load or unload such equipment with respect to the trailer-bed, and wherein such ramp units are retractable after the equipment is loaded or unloaded so that the trailer-bed assembly of this invention does not interfere with the movement of the trailer over the highway in the transportation of the equipment from one location to another.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

Fig. 1 is an elevation illustrating the ramp device or assembly of this invention mounted on a trailer when such ramp device or assembly is in the retracted position;

Fig. 2 is a partial elevation illustrating the ramp device or assembly of this invention in an intermediate position;

Fig. 3 is a view similar to Fig. 2, except that it shows the ramp device or assembly of this invention in the loading and unloading position wherein the equipment to be loaded on the trailer is adapted to be received thereon as it is either loaded or unloaded with respect to the trailer;

Fig. 4 is an isometric view illustrating the ramp device or assembly of this invention in detail;

Fig. 5 is a view, partly in elevation and partly in section, illustrating one construction for effecting the movement of the ramp device of this invention from its retracted position to its loading or unloading position; and, Fig. 6 is a view, partly in elevation and partly in section, illustrating a modified means for effecting the actuation or operation of the ramp device or assembly of this invention.

In the drawings, the letter A designates generally the retractable ramp device or assembly of this invention. Such device or assembly A is adapted to be mounted on a platform P which is positioned above the ground level G. The ramp device or assembly A is adapted to be used in an inclined position (Fig. 3) for supporting a vehicle or other equipment having traction means such as wheels or lug-type traction wheels as such vehicle or equipment is moved from the ground to the platform P or from the platform P to the ground G. As will be explained in detail, the ramp device or assembly A is adapted to be automatically moved from the inclined loading or unloading position of Fig. 3 to the inactive or raised position of Fig. 1 after the loading or unloading operations, and also from the raised position back to the inclined position for subsequent loading or unloading operations.

Although the ramp device or assembly A can be utilized in connection with a fixed platform P, the platform P will ordinarily be a trailer bed of known construction having wheels 10 at the rear thereof and having connection at its forward end with a fifth wheel 11 of conventional construction mounted on a truck T which is also of conventional or known construction. Since the ramp device or assembly A of this invention can be raised to an inactive position wherein it is resting upon the platform P, the transportation of a vehicle or equipment which is positioned on the platform P is facilitated and interference with the movement of the platform P is avoided. Also, as will be explained in detail hereinafter, the ramp device or assembly A is adapted to be automatically moved to the inclined loading or unloading position from its retracted transportation position when it is desired to unload the vehicle or other equipment from the platform P after transporting same.

Considering the invention in detail the ramp device or assembly A of this invention includes a pair of track units 20 which together serve as a vehicle support means for supporting the vehicle or other equipment which is loaded or unloaded with respect to the platform P. The track units 20 are spaced laterally from each other so that when such units 20 are in the loading position (Fig. 3) the wheels, lug-type traction members or any other traction means for equipment or vehicles have to be positioned on such track units 20 for a rolling or sliding movement relative to such units 20. When the platform P is a trailer bed, as is the usual case, the track units 20 are ordinarily spaced apart laterally approximately the width of the trailer bed itself due to the fact that the wheels or other traction members on the equipment or vehicle to be loaded upon the trailer bed or platform P are spaced apart approximately the same distance as the rear wheels 10 of the trailer bed or platform P.

Each of the track units 20 is preferably formed with two sections 21 and 22 which are pivotally connected together with a hinge means 23. The track section 21 of each of the track units 20 is positioned adjacent the end of the platform P and it is provided with a lower base portion 21a which is preferably formed of a very strong material such as steel, and preferably, an upper portion 21b is mounted on the base portion 21a and such upper portion 21b is preferably formed of wood or other material which facilitates the traction with the lugs of a lug traction member or the wheels of a vehicle moving thereon. Ordinarily, the boards or other material of the upper portion 21b are bolted or otherwise suitably connected to the base plate 21a, but it will be appreciated that various means for connecting such upper portion 21b to the base 21a can be provided within the scope of the art. Each of the inner track sections 21 is provided with pivot pins 21c (Fig. 4) extending from each side thereof through openings 25a in pivot plates 25 on each side of the track section 21. The pins 21c on each of the track sections 21 and the pivot pin support plates 25 can of course be formed in numerous ways so long as pivoting of the track section 21 with respect to the platform P is permitted. It will be observed that the track plate portion 21b rests upon an inclined end surface 26 (Figs. 1 and 4) when the track units 20 are in the inactive supported position for transportation purposes. The pivot plates 25 are welded or otherwise connected to the platform P and are fitted according to the incline of the inclined surface 26 as best seen in Fig. 4.

The other track section 22 of each of the track units 20 is substantially identical with the track section 21 in that it has a base plate 22a which is formed of steel or other very strong material and it is preferably provided with an upper portion or layer of wood 22b or any other suitable material which facilitates traction with the traction members of the vehicle or equipment which is moved thereon. Such boards or surface members 22b are suitably connected with the base member 22a by bolts or other securing means so that when the boards become worn they may be replaced readily, which is also true of the boards or surface members 21b.

The hinge means 23 connecting the sections 21 and 22 is formed with hinge plates 30 on the outer end of the track section 21 of each track unit 20. Such hinge plates 30 are provided with openings 30a therethrough. Each of the track sections 22 has hinge plates 31 formed or connected therewith, and a hinge pin or pins 31a extends from the hinge plates 31 through the openings 30a in the hinge plates 30. The pin 31a can of course extend for the full width of the section 22 so as to project through both of the openings 30a and suitable means are provided to prevent such pin or pins 31a from sliding laterally from the openings 30a. In any event, the hinge means 23 permits the folding of the track sections 21 and 22 with respect to each other so that such sections are adapted to fold upwardly from the loading position of Fig. 3 to the intermediate position of Fig. 2 and finally to the transportation or inactive position of Figs. 1 and 4. It should be noted that when the track sections 21 and 22 are in their loading position of Fig. 3, they are prevented from moving downwardly about the hinge means 23 by the abutment of the surface 22c on the member 22 with the surface 21d on the member 21 of each of the track units 20. Such abutment of the surfaces 22c and 21d thus locks the sections 21 and 22 in alignment with each other when each of the track units 20 is in its loading or inclined position so that the upper surfaces of the sections 21 and 22 of each track unit 20 form a straight continuous surface on which the wheels or other traction members of the equipment or vehicle being moved thereon are adapted to be positioned.

In order to move the track units 20 from their inclined loading position of Fig. 3 to their retracted inactive position of Figs. 1 and 4 wherein the track units 20 are resting upon the rear end of the platform P, an actuating or operating means is provided so that such movement of the track units 20 is accomplished without the necessity of manual manipulation. Such actuating means also serves to accomplish the movement of the track units 20 from the retracted position of Figs. 1 and 4 to the intermediate position of Fig. 2 and finally to the loading inclined position of Fig. 3, as will be more fully explained. The actuating or operating means includes a laterally extending operating shaft or rod 35 which is suitably supported at the rear end of the platform P with fixed support brackets 36 which are welded or otherwise secured to the platform P, preferably below the inclined portion 26. The operating shaft or rod 35 may extend through a pipe support mounted in the brackets 36 (such pipe being omitted for clarity) and it will be understood that suitable bearings such as ball bearings may be included in connection with the brackets 36 if so desired for facilitating the turning movement of the shaft or rod 35 with respect to the brackets 36. A control lever 37 is fixed to the operating shaft or rod 35 at its lower end so that movement of the control lever 37 imparts movement to the shaft or rod 35. The upper or forward end of the control lever 37 is suitably connected with a cable or control line 38 which extends below the upper surface of the platform P so as to be concealed and so as to prevent damage thereto during use, and such cable 38 extends forwardly to the winch 39 which is of conventional construction and which is normally positioned at the rear of the truck T (Figs. 1 and 5). Thus, when the cable 38 is pulled forwardly by the operation of the winch 39, the lever 37 is pulled forwardly to turn the rod or shaft 35 in a counterclockwise direction as viewed in Fig. 5. When the winch 39 is released so that the cable 38 can move rearwardly, the lever 37 is then permitted to move rearwardly so that the shaft 35 can rotate or turn in a clockwise direction as viewed in Fig. 5.

The rotation of the shaft or rod 35 is transmitted to operating arms or members 40 which are connected at the outer ends of the shaft or rod 35 for movement therewith. Each of the operating arms or members 40 is substantially L-shaped with the lower end thereof having connection with the shaft or rod 35 and with the upper end thereof being free from any connection. The long portion of each operating arm 40 is between and substantially parallel to the sections 21 and 22 when they are in their folded or retracted position (Figs. 1 and 4). A rounded elongated portion 40a is provided at the upper end of each of the arms 40 to serve as a bearing contact to facilitate the movement of the track units 20 to and from the inclined loading position as will be more evident hereinafter. It will be noted however that such bearing portion 40a is not connected to any portion of the track units 20 but is free to move relative thereto within the limits of the particular construction illustrated. Each of the operating arms 40 has a weight section 41 welded or otherwise secured thereto. Such weight sections serve as rear bumpers during the transportation and use of the assembly or device A of this invention.

In the operation or use of the preferred form of the invention illustrated in Figs. 1–5 of the drawings, it will be assumed that the platform P is a trailer bed of a conventional trailer used for hauling heavy equipment such as draglines, power shovels and other equipment which normally has the lug-type traction members therewith. However, it will be understood that this invention is equally applicable to other types of equipment which are adapted to be loaded and unloaded from a platform P at a predetermined elevation above the ground level G.

The ramp device or assembly A of this invention is in the retracted or inactive position illustrated in Fig. 1 during the transportation thereof, whether the platform P has a vehicle or other equipment thereon, or not. Thus, assuming that the trailer bed or platform P is empty and the ramp assembly or device A is in the retracted position, and further assuming that it is desired to load a device having traction members thereon onto the trailer bed or platform P, the lowering of the ramp device or assembly A is initiated by releasing the tension in the line 38 at the winch or drum 39. Such line or cable 38 of course was used for holding the control lever 37 in the forward position (Fig. 5) to maintain the ramp device or assembly A in the retracted position of Figs. 1 and 4, and therefore, as soon as the winch 39 is released, the control lever 37 is permitted to swing or move rearwardly so that the shaft or rod 35 is permitted to turn in a clockwise direction (as viewed in Fig. 5). The operating arms 40 are positioned between the plates 21 and 22 of each of the ramp units 20 when they are in their folded position of Figs. 1 and 4. The lowering of the ramp units 20 from the position of Fig. 1 to the position of Fig. 2 is preferably accomplished by first manually moving the ramp units 20 rearwardly to a position slightly rearwardly of a substantially vertical raised position so that the weight of the units 20 is then exerted on the arms 40 in a rearward and downward direction. The lowering of the units 20 can be controlled so that such lowering is gradual and is not damaging to the ramp units 20 by slowly letting the line or cable 38 run or pay out from the winch 39. Each of the ramp sections 22 hangs in a substantially vertical position as the ramp units 20 are lowered so that the outer ends 22d of each of the ramp sections 22 ultimately contacts the ground G as the assembly A is lowered (Fig. 2). In order to continue the unfolding of the ramp sections 21 and 22 so as to move same from the intermediate position of Fig. 2 to the inclined position of Fig. 3, the truck T is moved forwardly with the ends 22d of the ramp sections 22 in contact with the ground G, so that the ramp sections 22 tend to remain stationary as the platform P is moved forwardly which of course tends to move the ramp sections 21 forwardly with respect to the ramp sections 22. The forward movement of the truck T and the platform P is stopped when the ramp units have reached their inclined position with the sections 21 and 22 of each of the units 20 in alignment with each other (Fig. 3). It should be noted that if the platform P is a fixed platform rather than a trailer bed on a truck T, the sections 22 can be pulled manually outwardly away from the platform P to the position shown in Fig. 3, but such procedure is unnecessary when the platform P is movable as explained.

With the assembly A in the inclined loading position illustrated in Fig. 3, the equipment or vehicle to be loaded on the platform P is then rolled upwardly from the ground G along the ramp or track units 20 and onto the upper surface of the platform P. Obviously, any equipment or vehicles which are previously on the platform P can be unloaded also when the ramp device or assembly A is in the inclined position of Fig. 3.

When it is desired to retract the ramp device or assembly A from the inclined position for loading or unloading, the winch 39 is operated to impart a turning movement to the control lever 37 by means of the pull on the cable or line 38. As the lever 37 turns, it imparts the turning movement to the shaft or rod 35 in a counterclockwise direction (as viewed in Fig. 5) so that the operating arms 40 are likewise moved in a counterclockwise direction. Each of the operating arms 40 engages the lower or under surface of the ramp sections 21 so as the operating arms 40 are moved in a counterclockwise direction, the ramp sections 21 are raised and are pivoted about their pivot pins 21c. Since the operating arms 40 contact only the inner ramp sections 21 which are adjacent to the platform P, the lifting of such sections 21 with the arms 40 simultaneously causes a folding of the ramp sections 22 about the hinge means 23. Thus, as the assembly A is raised, it passes through the intermediate position illustrated in Fig. 2, and ultimately, the operating arms 40 are turned in a counterclockwise direction sufficiently to move the ramp sections 20 to the position shown in Figs. 1 and 4 wherein each of the operating arms 40 is sandwiched or positioned between the ramp sections 21 and 22 of each of the units 20. In that position, the cable holds the assembly or device A retracted and resting upon the inclined portion 26 of the platform P.

In Fig. 6 of the drawings, a hydraulic cylinder 50 and a hydraulic piston 51 therein are illustrated to show their connection through the rod 52 with the control lever 37. The hydraulic cylinder 50 preferably has a pivotal connection 50a to the platform to permit the arcuate swinging of the lever 37. The arrangement of Fig. 6 eliminates the use of the winch 39 and the cable 38 and shows another means for providing power for the manipulation of the control lever 37. It will be understood of course that various types of power means can be used other than those shown in the drawings and the two types illustrated are merely for purposes of illustration. Thus, with the device of Fig. 6, the hydraulic or pneumatic fluid is admitted into the cylinder 50 through suitable controls and equipment of known construction to cause the piston 51, rod 52 and lever 37 to move either rearwardly or forwardly gradually as desired. The movement of the piston 51 in the hydraulic or pneumatic cylinder 50 forwardly would move the lever 37 forwardly when it is desired to retract the assembly A to the retracted position of Figs. 1 and 4.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A ramp device for loading and unloading vehicles from a platform on a vehicle or the like, comprising vehicle support means which is adapted to extend from the platform to the ground in an inclined position with respect to the ground to support vehicles moving thereon from the ground to the platform or from the platform to the ground, means pivotally connecting said vehicle support means to said platform, said vehicle support means being formed in two separate track units spaced laterally with respect to each other to receive the traction means of the vehicle, each of said track units having two sections which are hinged together with one of the sections also being hinged to said platform, means for manipulating said track units to raise same from the inclined position to position the track units in an inactive position resting upon said platform, said means for manipulating said track units including a laterally extending rod mounted on said platform for rotational turning movement, an operating arm near each end of said rod for turning therewith, each operating arm being positioned under said sections when said track units are in the inclined position and between said sections when said track units are in the inactive position, and each of said arms being free from connection with the track units while slidably engaging said one of the sections which is hinged to said platform for raising the same from the inclined position to the inactive position.

2. A ramp device for loading and unloading vehicles from a platform on a vehicle or the like, comprising vehicle support means which is adapted to extend from the platform to the ground in an inclined position with respect to the ground to support vehicles moving thereon from the ground to the platform or from the platform to the ground, means pivotally connecting said vehicle support means to said platform, said vehicle support means being formed in two separate track units spaced laterally with respect to each other to receive the traction means of the vehicle, each of said track units having two sections which are hinged together with one of the sections also being hinged to said platform, means for manipulating said track units to raise same from the inclined position to position the track units in an inactive position resting upon said platform, said means for manipulating said track units including a laterally extending rod mounted on said platform for turning movement, an operating arm near each end of said rod for rotational turning therewith, each operating arm being positioned under said sections when said track units are in the inclined position and between said sections when said track units are in the inactive position, and each of said arms slidably engaging said one of the sections which is hinged to said platform for raising same from the inclined position to the inactive position, a control lever mounted on said rod substantially centrally between said operating arms, and power means for moving said control lever for rotatably turning said rod for thereby rotatably turning said operating members to effect a raising of said track units.

3. A ramp device for loading and unloading vehicles from a platform on a vehicle or the like, comprising vehicle support means which is adapted to extend from the platform to the ground in an inclined position with respect to the ground to support vehicles moving thereon from the ground to the platform or from the platform to the ground, means pivotally connecting said vehicle support means to said platform, said vehicle support means being formed in two separate track units spaced laterally with respect to each other to receive the traction means of the vehicle, means for manipulating said track means to raise same from the inclined position to position the track units in an inactive position resting upon said platform, said means for manipulating said track means includes a laterally extending rod mounted on said platform for rotational turning movement, an operating arm near each end of said rod for turning therewith, each of said arms being positioned under and in slidable engagement with one of the track units for raising same from the inclined position to a retracted position, a control lever mounted on said rod substantially centrally between said operating arms, power means for moving said control lever for turning said rod for thereby turning said operating members to effect a raising or lowering of said track units, each of said track units being formed in sections, hinge means connecting said sections together for folding upwardly only, pivotal connection means connecting one of said sections in each unit to said platform, each of said operating arms engaging only the one of said sections in each track unit which is pivotally connected to said platform to effect a folding of each track unit as it is moved upwardly from the inclined position, and each of said operating arms extending between said sections of each track unit when each unit is in the folded position.

4. A ramp device for loading and unloading vehicles from a platform on a vehicle or the like, comprising vehicle support means which is adapted to extend from the platform to the ground in an inclined position with respect to the ground to support vehicles moving thereon from the ground to the platform or from the platform to the ground, means pivotally connecting said vehicle support means to said platform, said vehicle support means including a track unit having two sections which are hinged together with one of the sections also being hinged to said platform, means for manipulating said track unit to raise same from the inclined position to position the track unit in an inactive position resting upon said platform, said means for manipulating said track unit including a laterally extending rod mounted on said platform for rotational turning movement, an operating arm connected to said rod for turning therewith, said operating arm being positioned under said sections when said track unit is in the inclined position and between said sections when said track unit is in the inactive position, and said arm being free from connection with the track unit while slidably engaging said one of the sections which is hinged to said platform for raising same from the inclined position to the inactive position.

References Cited in the file of this patent

UNITED STATES PATENTS

| | | |
|---|---|---|
| 2,441,710 | Martin | May 18, 1948 |
| 2,452,681 | Rehberger | Nov. 2, 1948 |
| 2,452,789 | Pike | Nov. 2, 1948 |
| 2,750,226 | Ash | June 12, 1956 |
| 2,756,882 | Albertson | July 31, 1956 |
| 2,776,063 | Larson | Jan. 1, 1957 |